US012677753B2

(12) United States Patent
Heitman et al.

(10) Patent No.: US 12,677,753 B2
(45) Date of Patent: Jul. 14, 2026

(54) ROUND BALERS WITH A REDIRECTING ASSEMBLY

(71) Applicant: Vermeer Manufacturing Company, Pella, IA (US)

(72) Inventors: Bryce Heitman, Newton, IA (US); Spencer Fynaardt, Pella, IA (US); Calvin Meinders, Pella, IA (US); Blake Wilson, Altoona, IA (US); JJ Dooyema, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 392 days.

(21) Appl. No.: 18/359,781

(22) Filed: Jul. 26, 2023

(65) Prior Publication Data

US 2024/0032477 A1 Feb. 1, 2024

Related U.S. Application Data

(60) Provisional application No. 63/422,487, filed on Nov. 4, 2022, provisional application No. 63/392,369, filed on Jul. 26, 2022.

(51) Int. Cl.
*A01F 15/10* (2006.01)
*A01F 15/18* (2006.01)

(52) U.S. Cl.
CPC ............ *A01F 15/106* (2013.01); *A01F 15/18* (2013.01); *A01F 2015/183* (2013.01)

(58) Field of Classification Search
CPC ... A01F 15/106; A01F 15/18; A01F 2015/183
See application file for complete search history.

(56) References Cited

U.S. PATENT DOCUMENTS

| | | | |
|---|---|---|---|
| 3,722,197 A | 3/1973 | Vermeer | |
| 4,208,862 A * | 6/1980 | Waldrop | A01F 15/0883 100/88 |
| 4,252,057 A | 2/1981 | Gaeddert et al. | |
| 4,549,481 A * | 10/1985 | Groeneveld | A01F 15/07 100/88 |
| 4,993,217 A * | 2/1991 | Pfrimmer | A01F 15/106 100/88 |
| 5,450,704 A * | 9/1995 | Clostermeyer | A01F 15/106 100/88 |
| 6,332,309 B1 | 12/2001 | Rodewald | |

(Continued)

FOREIGN PATENT DOCUMENTS

| | | | | |
|---|---|---|---|---|
| DE | 29706540 U1 * | 6/1997 | | A01F 15/07 |
| DE | 202012006898 U1 | 10/2013 | | |

(Continued)

*Primary Examiner* — Arpad Fabian-Kovacs
(74) *Attorney, Agent, or Firm* — Armstrong Teasdale LLP

(57) ABSTRACT

A baling system for baling crop material. The baling system includes one or more bale-forming belts, one or more rollers, and a bale formation chamber defined in part by the one or more bale-forming belts and the one or more rollers. The baling system also includes a crop feeding device operable to convey crop material towards the bale formation chamber and a redirecting assembly in a fixed position proximate the bale formation chamber to redirect stray crop material exiting the bale formation chamber towards the crop feeding device.

20 Claims, 18 Drawing Sheets

(56) References Cited

U.S. PATENT DOCUMENTS

| | | | | |
|---|---|---|---|---|
| 6,477,824 B2 * | 11/2002 | Preheim | ................. | A01F 15/106 |
| | | | | 56/341 |
| 6,655,121 B1 * | 12/2003 | Viesselmann | ......... | A01F 15/106 |
| | | | | 100/88 |
| 6,679,040 B2 * | 1/2004 | Lucand | ................... | A01F 15/07 |
| | | | | 100/88 |
| 7,311,040 B2 * | 12/2007 | Viaud | ..................... | A01F 15/07 |
| | | | | 100/88 |
| 7,694,504 B1 * | 4/2010 | Viaud | ................... | A01F 15/106 |
| | | | | 56/341 |
| 8,821,104 B2 | 9/2014 | Yasuda et al. | | |
| 11,596,106 B2 | 3/2023 | Schlichting et al. | | |
| 2005/0198935 A1 * | 9/2005 | Johnson | ................... | A01F 15/08 |
| | | | | 56/341 |
| 2008/0041028 A1 * | 2/2008 | Viaud | ................. | A01F 15/0883 |
| | | | | 100/88 |
| 2010/0192516 A1 * | 8/2010 | Olander | ............. | A01F 15/0715 |
| | | | | 53/118 |
| 2013/0032047 A1 * | 2/2013 | Marques | ................. | A01F 15/18 |
| | | | | 100/88 |
| 2018/0242528 A1 * | 8/2018 | Rodewald | ............. | B60W 10/02 |
| 2020/0178469 A1 * | 6/2020 | Schlichting | ......... | A01F 15/0715 |
| 2021/0185933 A1 | 6/2021 | Schlicting et al. | | |
| 2023/0371437 A1 * | 11/2023 | Horstmann | ........... | A01F 15/106 |

FOREIGN PATENT DOCUMENTS

| | | | | |
|---|---|---|---|---|
| DE | 102016104164 A1 * | 9/2017 | ......... | A01F 15/0715 |
| EP | 0339730 B1 * | 4/1993 | ............. | A01F 15/07 |
| EP | 1214874 A1 * | 6/2002 | ............. | A01F 15/07 |
| EP | 1214875 A1 * | 6/2002 | ......... | A01F 15/0883 |
| EP | 2550854 A1 * | 1/2013 | ......... | A01F 15/0883 |
| EP | 2767153 A2 * | 8/2014 | ......... | A01F 15/0715 |
| FR | 2767635 A1 | 3/1999 | | |

* cited by examiner

ROUND BALERS WITH A REDIRECTING ASSEMBLY

CROSS REFERENCE TO RELATED APPLICATIONS

This application claims the benefit of priority to U.S. Provisional Patent Application No. 63/392,369, filed Jul. 26, 2022, and U.S. Provisional Patent Application No. 63/422,487, filed Nov. 4, 2022, the contents and disclosure of which are incorporated by reference herein in their entirety.

FIELD OF THE DISCLOSURE

The field of the disclosure relates generally to a baling machine and, more particularly, to a round baler having a crop-feeding device, a bale formation chamber of a variable diameter, as defined in part by rollers and bale forming belts, and a redirecting assembly to redirect stray crop material exiting the bale formation chamber towards the crop feeding device.

BACKGROUND

Round balers, machines that form bales of crop material into cylinders having a round cross-section, were initially capable of forming bales having a diameter of approximately twenty-four inches in diameter and a length of approximately forty-eight inches. The formed bales weighed between fifty and one hundred pounds, and could be lifted and moved manually. Round balers were developed to form much larger cylindrical bales, some with a diameter of approximately seventy two inches and a length of approximately sixty inches. These bales had to be lifted and moved with machinery. The basic mechanisms of the small round balers and the large round balers were significantly different, as a result of problems associated with forming larger bales.

Firstly, in forming a bale of crop material, a bale core is formed. As crop material enters a bale formation chamber of the round baler, the crop material is rolled in a circular manner to form the bale core. Secondly, the bale grows in size from the bale core to a fully formed bale. Some known round balers have a variable diameter bale formation chamber to allow the bale to grow in size, while compression force is maintained to ensure desired bale density.

As crop material is rotated around the bale formation chamber, stray crop material may undesirably exit the bale formation chamber in spaces between the rollers and/or the belts defining the chamber. Some known round balers have used a gate assembly with curved finger members to extend over and close the space between the rollers and/or the belts to preclude the crop material from undesirably exiting the bale formation chamber while the bale core is being formed. However, known gate assemblies used with round balers may be complex, requiring withdrawal from between the rollers and/or the belts as the bale increases in size.

As round balers evolved, arrangements of bale forming rollers and/or belts without similar gate assemblies became known. As an example, FIGS. 1-5 illustrate one embodiment of a baler 100 as known in the prior art. The baler 100 includes a crop pickup device 102, a crop feeding device 104, and a bale formation chamber 105. The crop feeding device 104 moves crop material through a crop inlet 106 to the bale formation chamber 105. The bale formation chamber 105 is adjacent the crop inlet 106 and is defined by a lower throat roller 110, one or more bale forming belts 120, a front belt roller 130 and a plurality of upper throat rollers 140, 142. As illustrated in FIG. 1, the lower throat roller 110 turns clockwise to propel incoming crop material into contact with the one or more bale forming belts 120. The one or more bale forming belts 120 move along a belt path 145 from the lower throat roller 110 towards the front belt roller 130 and around the bale formation chamber 105.

The upper throat roller 140 of round baler 100 turns clockwise. Thus, the surface of the upper throat roller 140 moves in the opposite direction to the one or more bale forming belts 120. As crop material is propelled generally upwards by the one or more bale forming belts 120, the upper throat roller 140 propels the crop material back down towards the crop inlet 106 and the lower throat roller 110. This generally circular movement causes a bale core to form. The differential in direction between the upper throat roller 140 and the one or more bale forming belts 120 is intended to strip crop material away from the one or more bale forming belts 120 as the bale core is formed. However, in some conditions, the crop material may not be stripped from the one or more bale forming belts 120, allowing stray crop material to undesirably exit the bale formation chamber 105 through spaces between the rollers and/or the belts defining the chamber.

FIGS. 2-5 illustrate variations in a trajectory 150 of crop material (illustrated by an arrow) as a bale 190 is formed and grows in size, specifically where the one or more bale forming belts 120 contact the front belt roller 130. The trajectory 150 represents an undesirable crop material trajectory as the one or more bale forming belts 120 separate from the surface of the bale of crop material to pass around the front belt roller 130. FIG. 2 illustrates the trajectory 150 for a small bale between the front belt roller 130 and the upper throat roller 140. In some known round balers, such as baler 100, there may be a small gap between the front belt roller 130 and the upper throat roller 140 to facilitate reducing the damage to the front belt roller 130 and/or the upper throat roller 140 from roller-to-roller contact. In some crop conditions, the crop material may not stick together as the bale is formed, instead moving with the bale forming belts 120 away from the forming bale. This may result in stray crop material following the trajectory 150 and undesirably exiting the bale formation chamber 105, which has been described as spewing. Thus, stray crop material may undesirably exit the bale formation chamber 105 through this gap between the front belt roller 130 and the upper throat roller 140, which may cause performance challenges in some crop conditions.

FIGS. 3 and 4 illustrate the trajectory 150 for larger bales, illustrating that the trajectory 150 changes as the bale 190 grows in size. For example, as shown in FIGS. 3 and 4, the trajectory 150 may change such that the crop material is directed into contact with the upper throat roller 140, instead of through the gap between the front belt roller 130 and the upper throat roller 140 when the forming bale is smaller, as shown in FIG. 2. Accordingly, there is a need for an improved arrangement of belts and/or rollers to define a bale formation chamber of a round baler that facilitates reducing an amount of stray crop material undesirably exiting the bale formation chamber as the bale grows in size in a variety of crop conditions.

SUMMARY

In one embodiment, a baling system for baling crop material is disclosed. The baling system includes one or more bale-forming belts, one or more rollers, and a bale formation chamber defined in part by the one or more bale-forming belts and the one or more rollers. The baling system also includes a crop feeding device operable to convey crop material towards the bale formation chamber and a redirecting assembly in a fixed position proximate the bale formation chamber to redirect stray crop material exiting the bale formation chamber towards the crop feeding device.

In another embodiment, a round baler is disclosed. The round baler includes a crop pickup device, one or more bale-forming belts, one or more rollers, and a bale formation chamber defined in part by the one or more bale-forming belts and the one or more rollers. The round baler also includes a crop feeding device operable to convey crop material from the crop pickup device towards the bale formation chamber and a redirecting assembly in a fixed position proximate the bale formation chamber to redirect stray crop material exiting the bale formation chamber towards the crop feeding device.

DETAILED DESCRIPTION

Figure 1A:
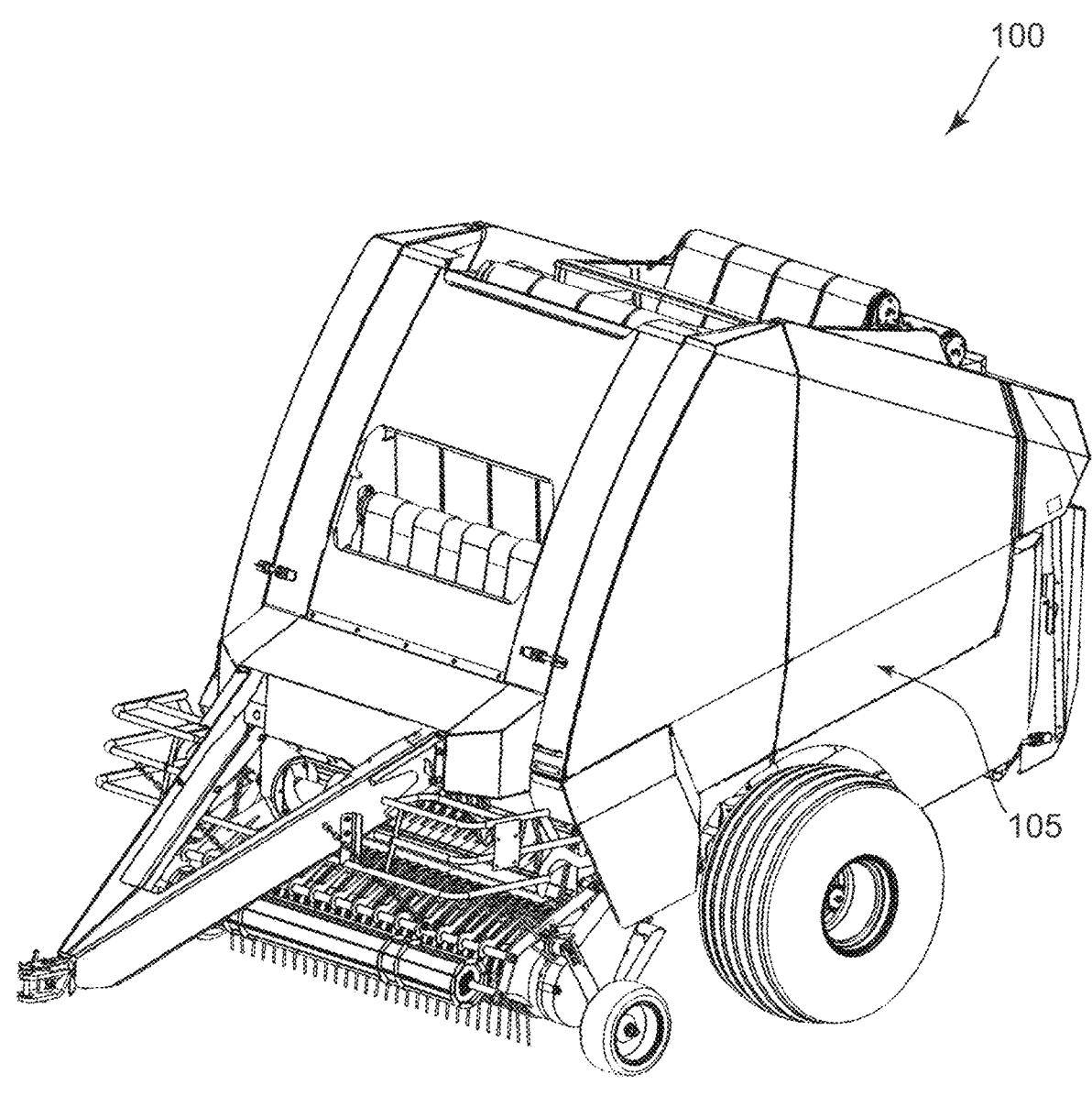
FIG. 1A is a perspective view of a round baler known in the prior art.
Figure 1B:
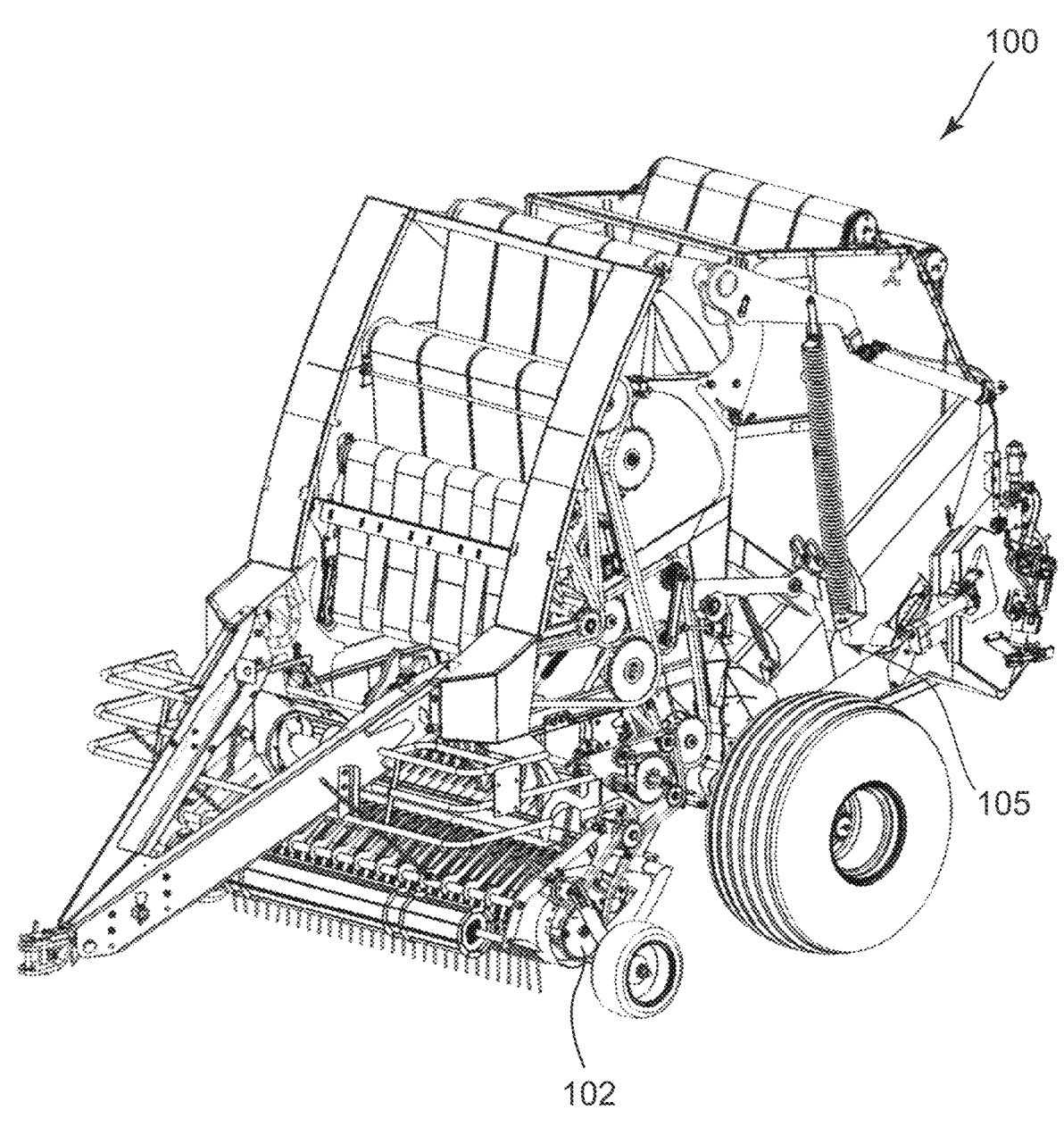
FIG. 1B is another perspective view of the prior art round baler shown in FIG. 1A.
Figure 1C:
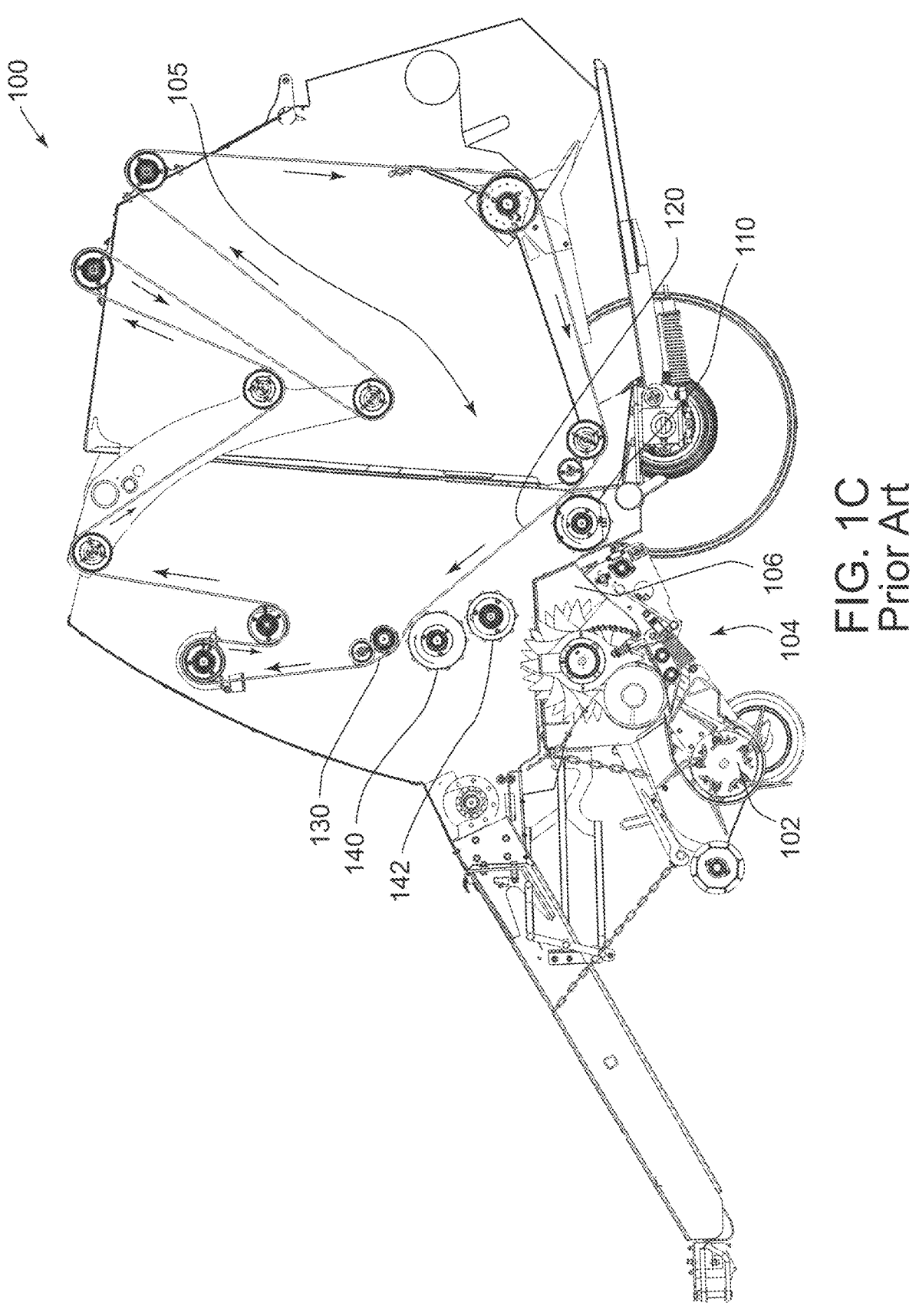
FIG. 1C is a side view of an internal configuration of the prior art round baler shown in FIG. 1A.
Figure 2:
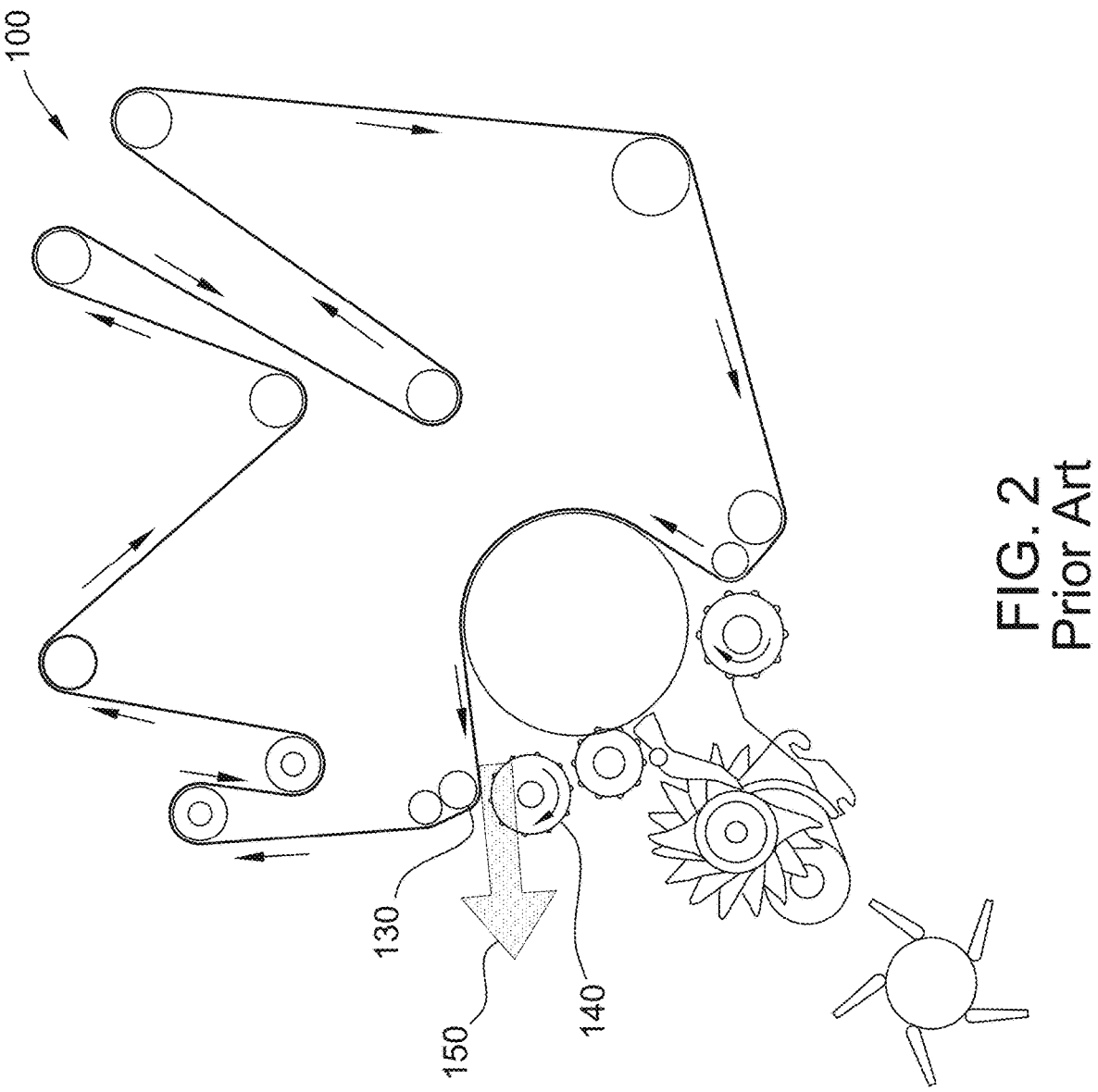
FIGS. 2-4 are further schematics of the prior art round baler shown in FIG. 1, including a bale growing in size as it is formed and an accompanying trajectory of crop material as the bale is formed.
Figure 3:
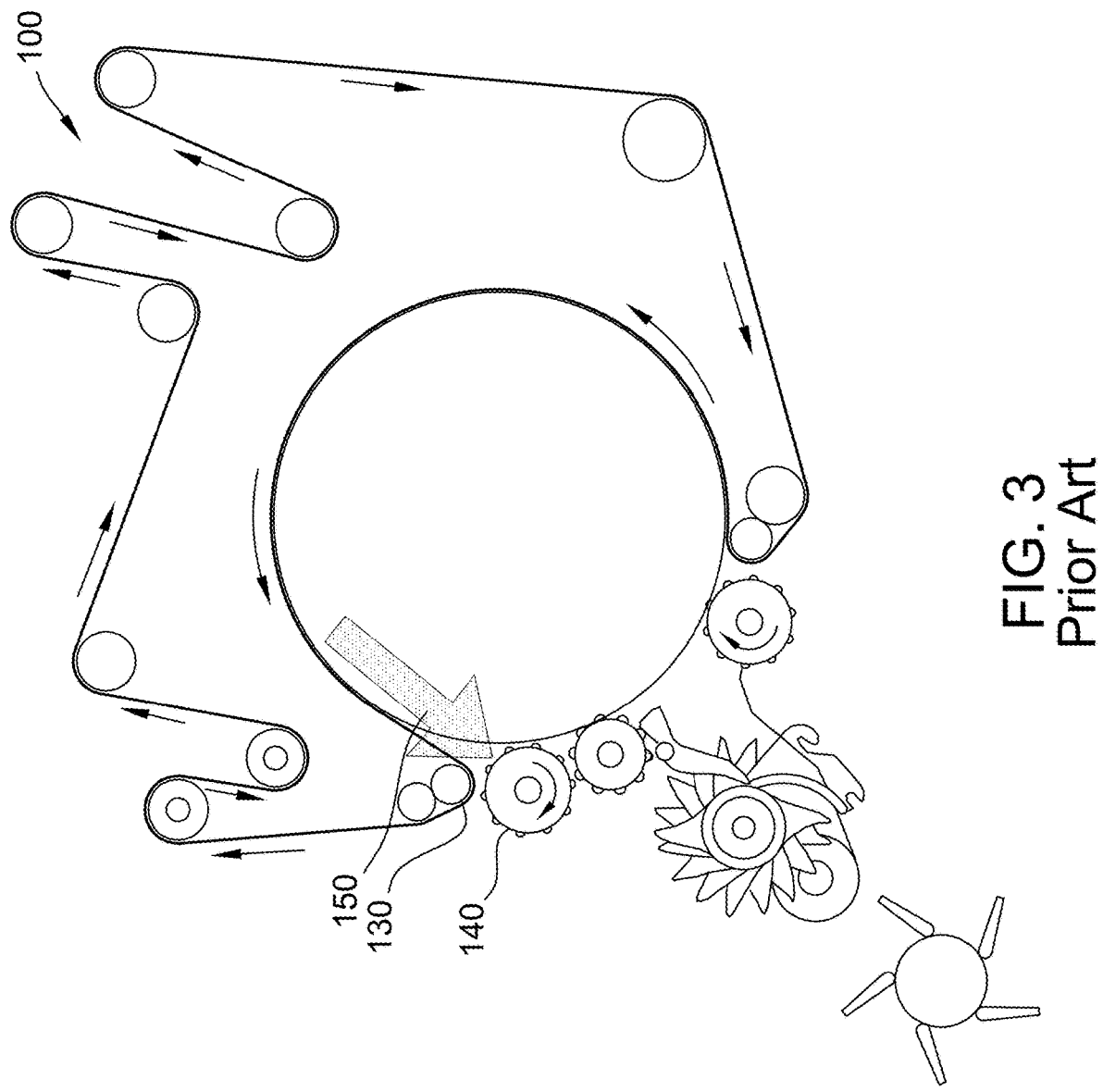
Figure 4:
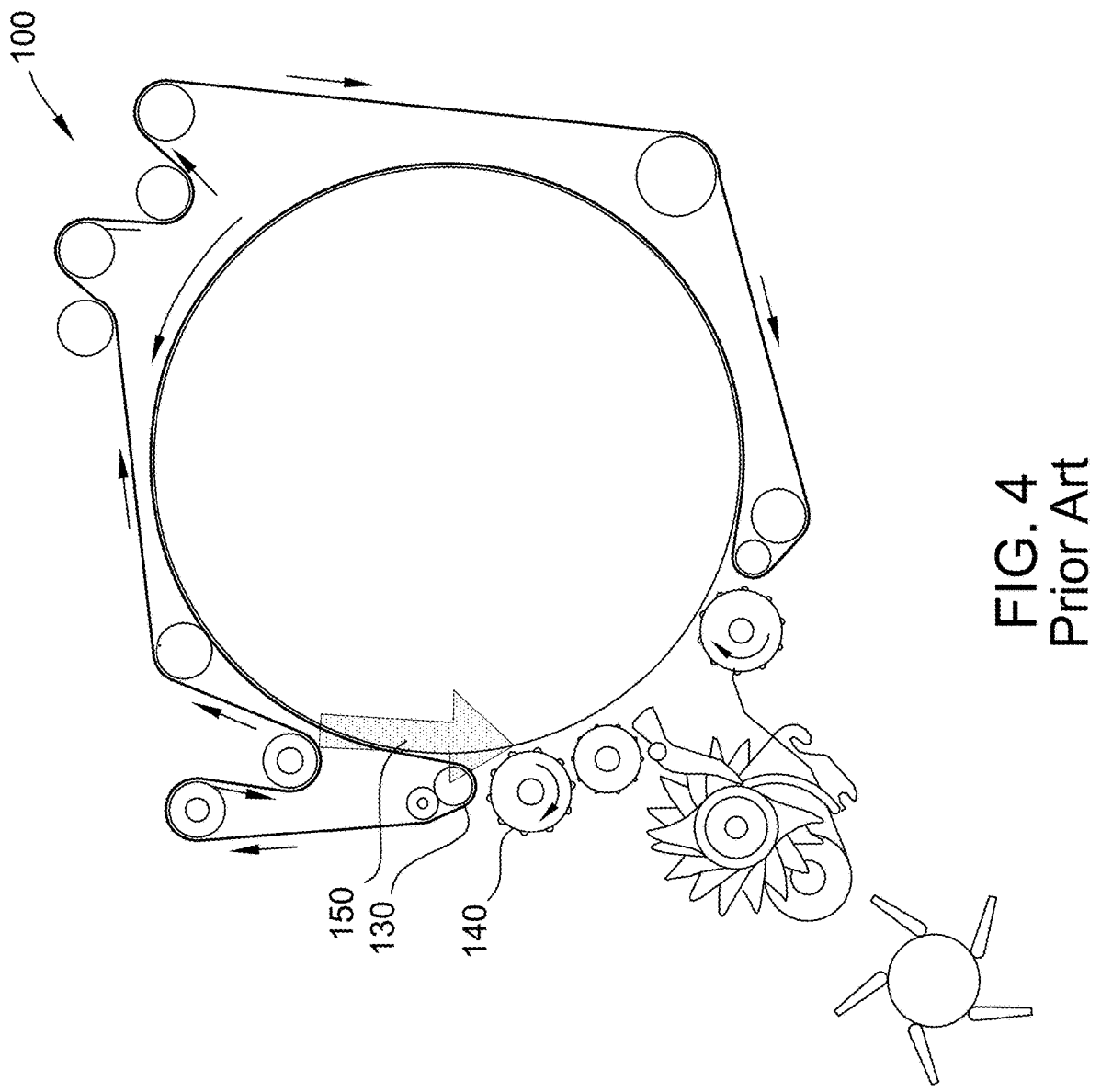
Figure 5:
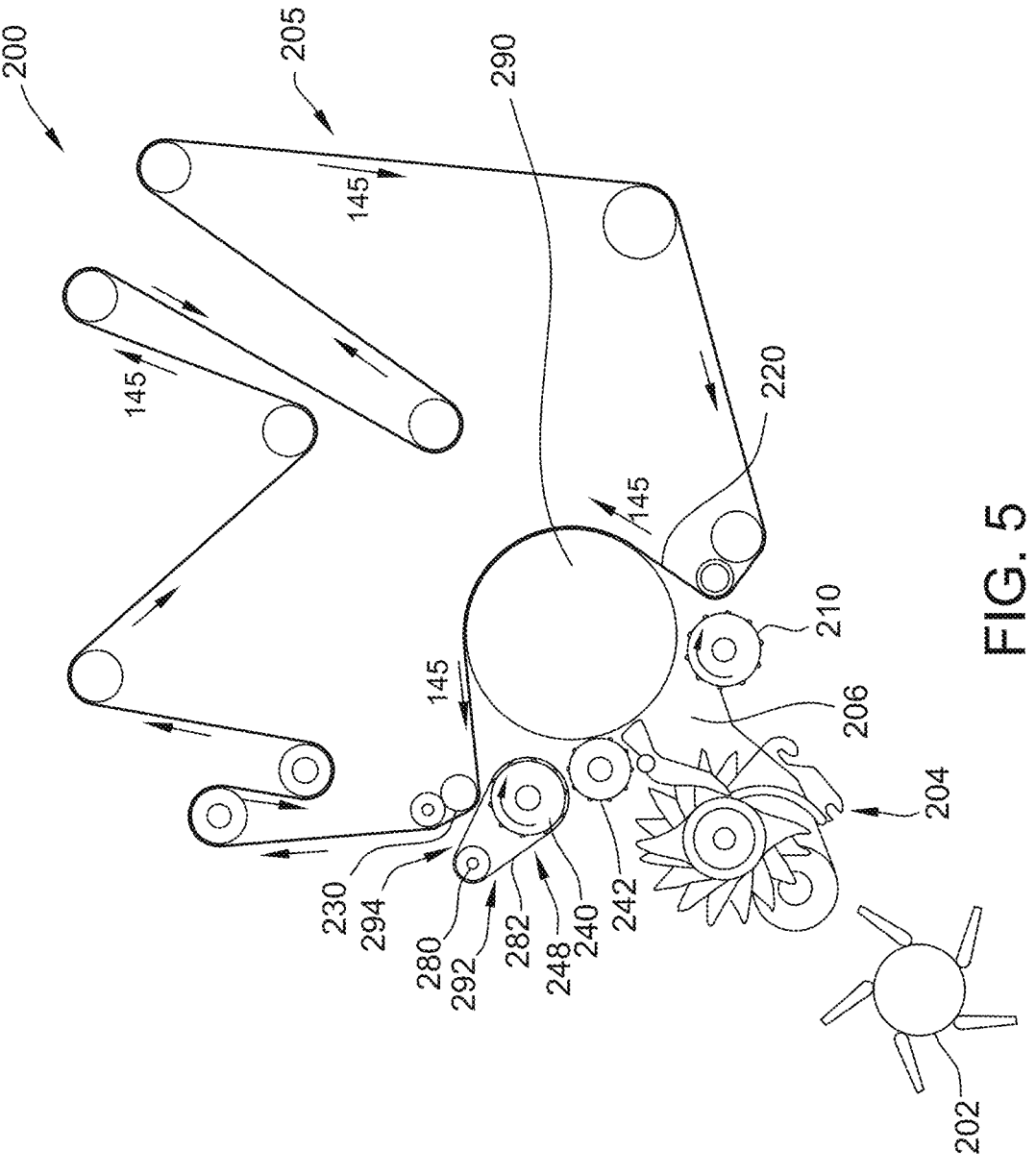
FIG. 5 is a side view of an embodiment of a redirecting assembly for use with a round baler.

FIG. 5 is a side view of a round baler 200. The round baler 200 includes a crop pickup device 202, a crop feeding device 204, and a bale formation chamber 205. The crop feeding device 204 moves crop material through a crop inlet throat 206 to the bale formation chamber 205 defined by a lower throat roller 210, one or more bale forming belts 220, a front belt roller 230, an upper throat roller 240, the crop inlet throat 206, and a second upper throat roller 242. The lower throat roller 210 turns clockwise to propel the incoming crop material into contact with the one or more bale forming belts 220. The one or more bale forming belts 120 move along the belt path 145 around a bale of crop material being formed, moving towards the front belt roller 230.

In the example embodiment, the round baler 200 also includes a redirecting assembly 248 to redirect stray crop material that may undesirably exit the bale formation chamber 105. In the example embodiment, the redirecting assembly 248 facilitates preventing stray crop material from undesirably exiting the bale formation chamber 205 by redirecting stray crop that follows the one or more bale formation belts 220 around the bale formation chamber 205. The redirecting assembly 248 is located in a fixed position proximate the bale formation chamber 205 throughout operation of the round baler 200. That is, the position of the redirecting assembly 248 is fixed throughout all phases of bale formation within the round baler 200, including, but not limited to, an empty bale formation chamber 205, any size of bale within the bale formation chamber 205, wrapping the bale within the bale formation chamber 205, and/or dumping the formed bale from the round baler 200.

As illustrated in FIG. 5, an embodiment of the redirecting assembly 248 includes an upper redirecting roller 280 and one or more redirecting belts 282. The one or more redirecting belts 282 are routed around the upper redirecting roller 280 and the upper throat roller 240, such that the one or more redirecting belts 282 facilitate stripping crop material that may follow the one or more bale formation belts 220 and/or closing a gap that may be present between the front belt roller 230 and the upper throat roller 240 as described previously in relation to the prior art. That is, the upper redirecting roller 280 is positioned adjacent the front belt roller 230, with the one or more redirecting belts 282 positioned to redirect stray crop material that may attempt to exit the bale formation chamber 205 through the gap between the front belt roller 230 and the upper throat roller 240.

In the example embodiment, the one or more redirecting belts 282 travel in a clockwise direction by the upper throat roller 240, which rotates clockwise as shown in FIG. 5. The one or more redirecting belts 282 are tensioned by the positioning of, and the space between, the upper redirecting roller 280 and the upper throat roller 240 to create sufficient friction for the one or more redirecting belts 282 to travel upon rotation of the upper throat roller 240. The one or more redirecting belts 282 have a first redirecting belt span 292 that extends between the upper throat roller 240 and the upper redirecting roller 280, and a second redirecting belt span 294 opposite the front redirecting belt span 292 between the upper throat roller 240 and the upper redirecting roller 280. The stray crop material may contact the second redirecting belt span 294 as a bale 290 of crop material is formed in the bale formation chamber 205.

Figure 6:
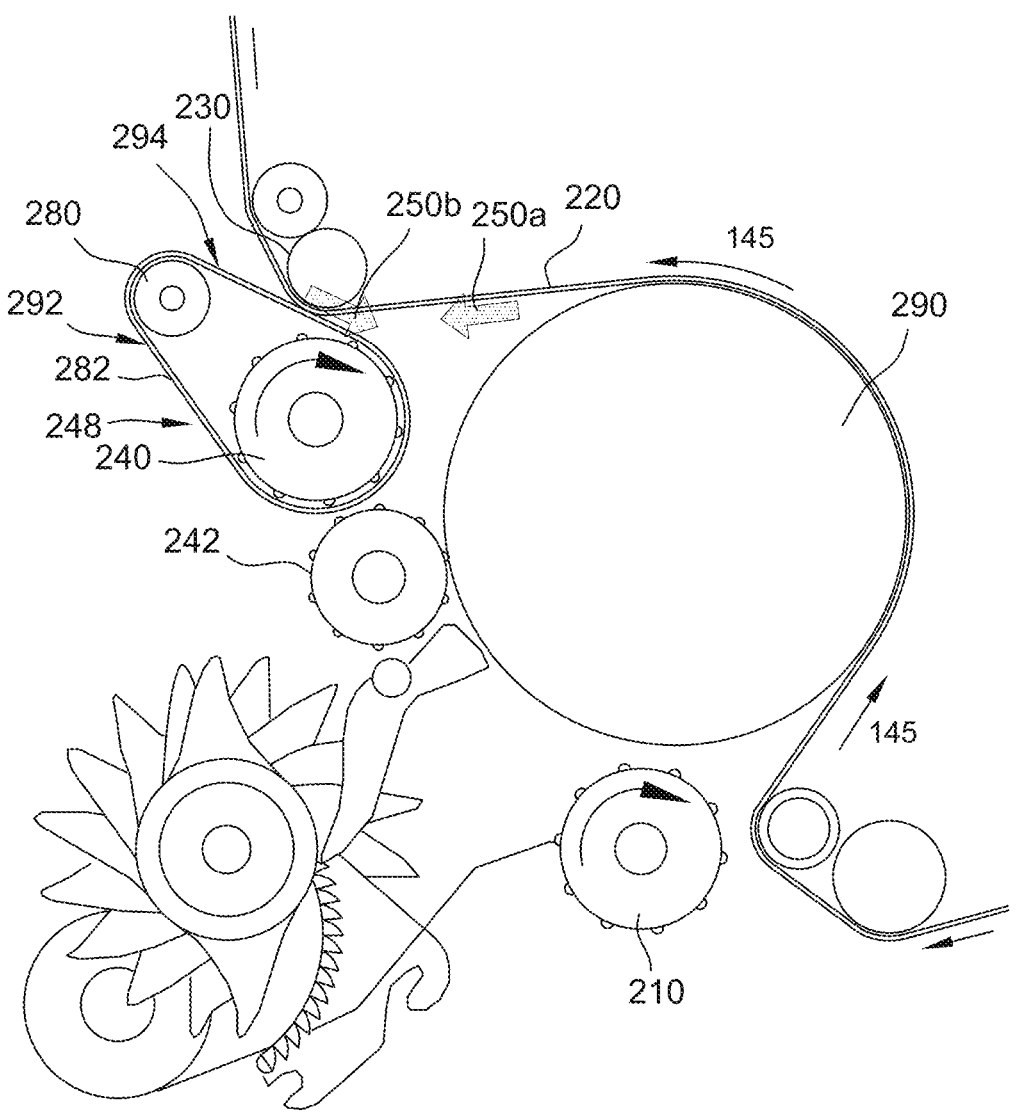
FIG. 6 is a detailed side view of the redirecting assembly shown in FIG. 5, including a bale growing in size and accompanying crop trajectories as the bale is formed.

FIG. 6 is a detailed side view of the round baler 200 including the redirecting assembly 248, illustrating one or more trajectories 250 of crop material (each trajectory illustrated by an arrow) as the bale 290 of crop material grows in size. For example, crop material may contact the one or more bale forming belts 220 to be moved towards the front belt roller 230 along a first trajectory 250a. When stray crop material moving along the first trajectory 250a contacts the redirecting assembly 248, the direction of rotation of the one or more redirecting belts 282 may move the stray crop material back along a second trajectory 250b towards the bale 290 that is being formed.

Figure 7:
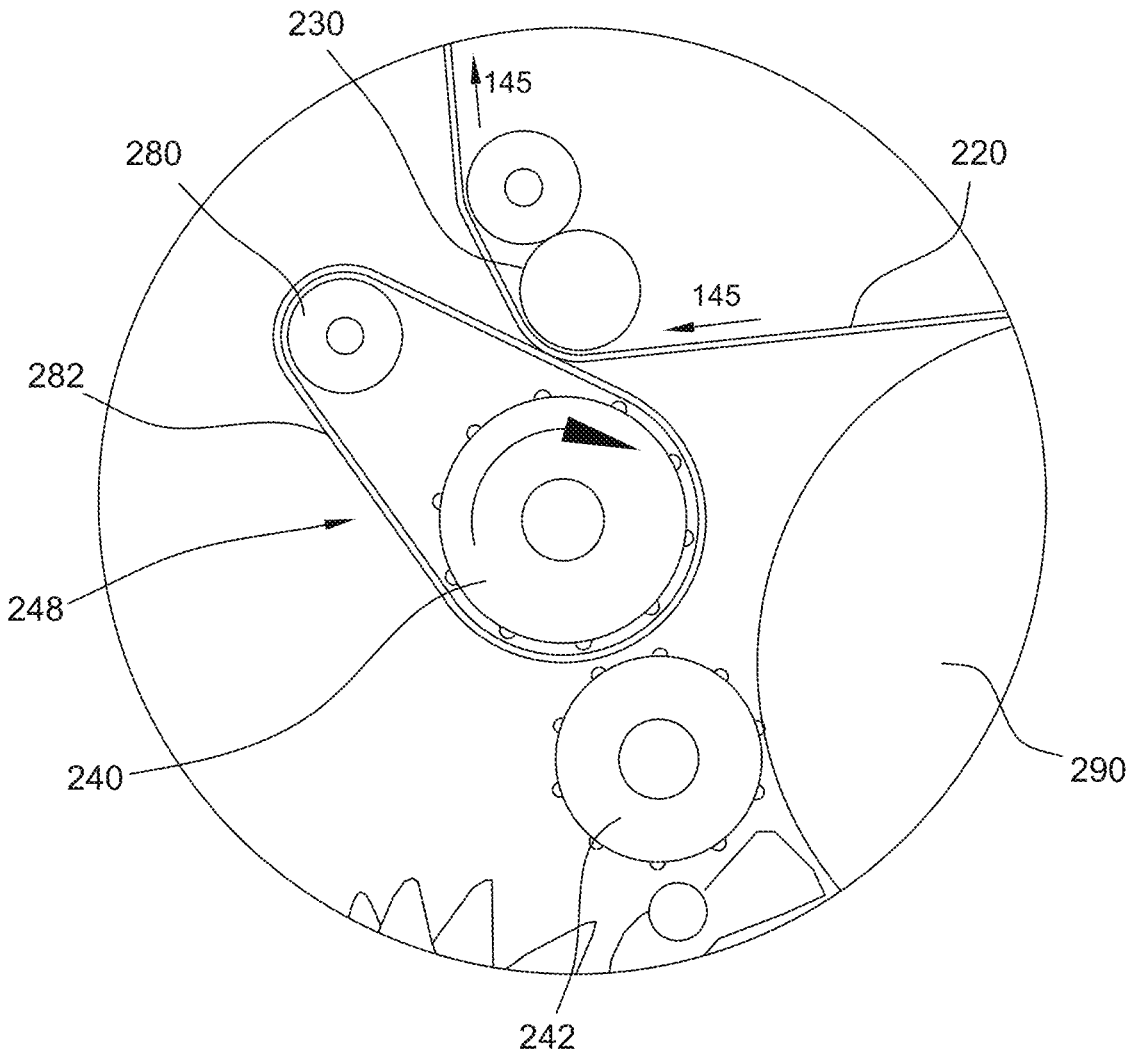
FIG. 7 is a detailed side view of one embodiment of the redirecting assembly shown in FIG. 5.

FIG. 7 is a detailed side view of the redirecting assembly 248 positioned such that the one or more redirecting belts 282 are proximate the one or more bale forming belts 220. For example, there may be no, or minimal, contact between the one or more redirecting belts 282 and the one or more bale forming belts 220, as shown in FIG. 7.

Figure 8:
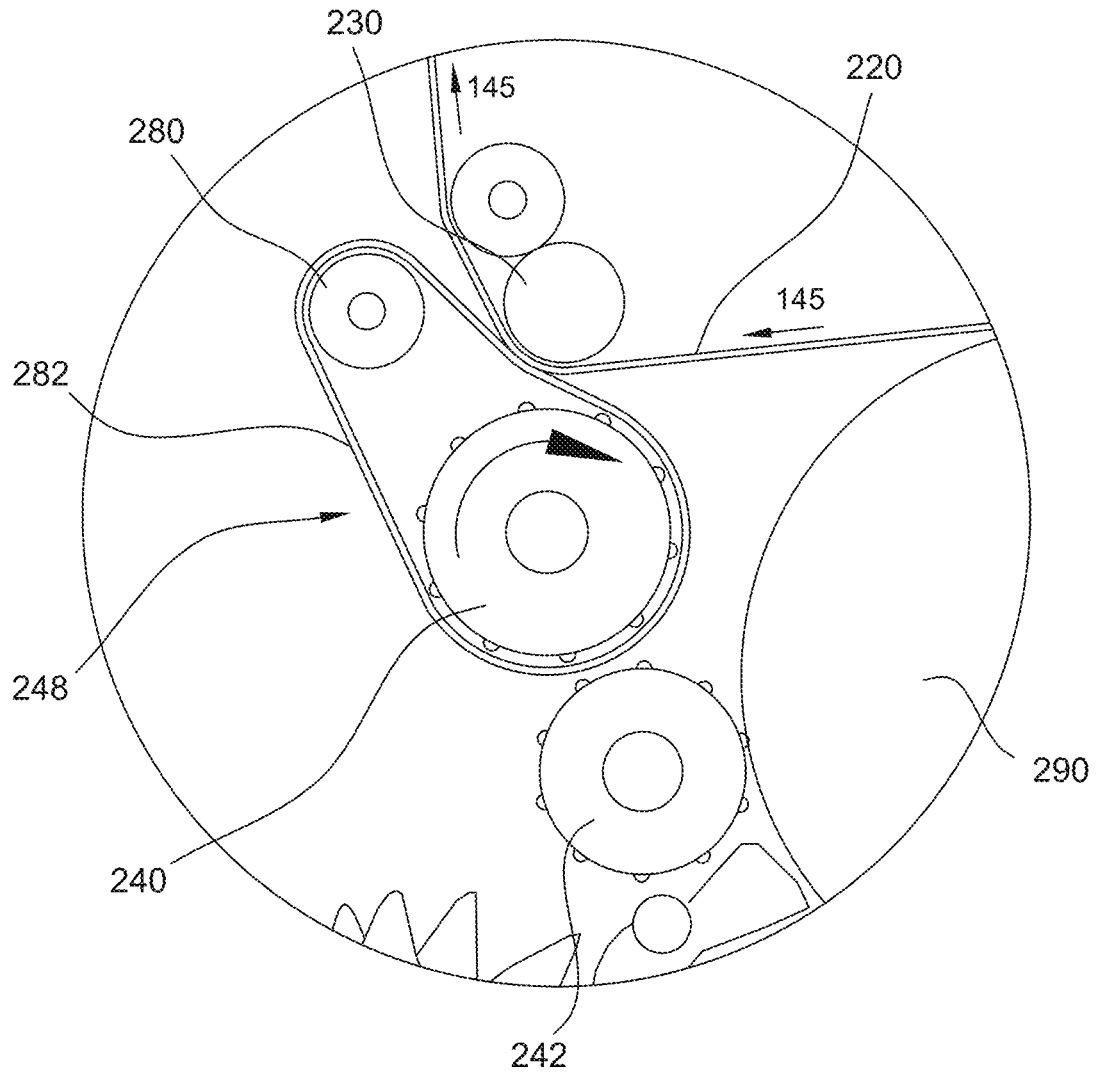
FIG. 8 is a detailed side view of another embodiment of the redirecting assembly shown in FIG. 5.

FIG. 8 is a detailed side view of the redirecting assembly 248 positioned such that the one or more redirecting belts 282 are in contact with the one or more bale forming belts 220. For example, there may be significant contact between the one or more redirecting belts 282 and the one or more bale forming belts 220, as shown in FIG. 8.

Figure 9:
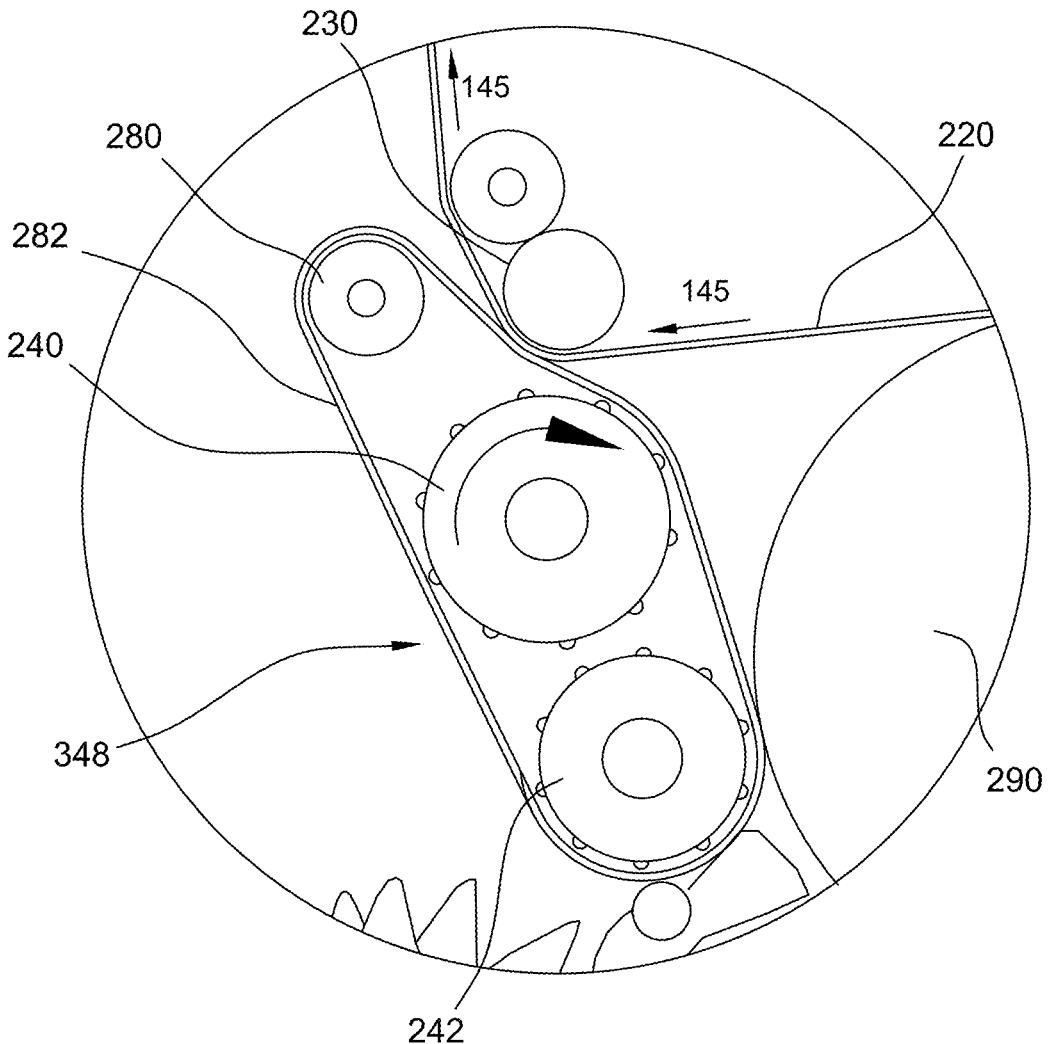
FIG. 9 is a detailed side view of another embodiment of a redirecting assembly for use with a round baler.
Figure 10:
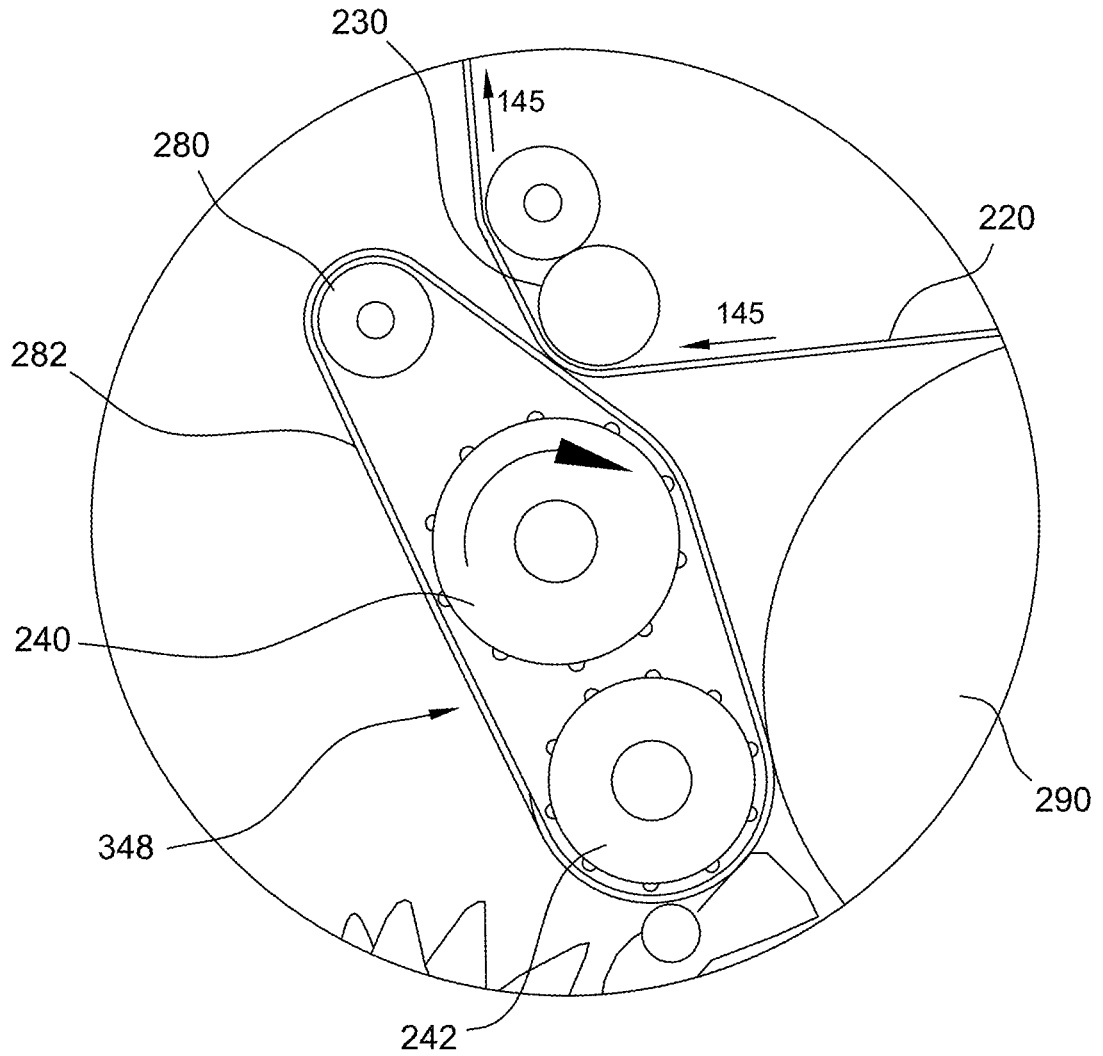
FIG. 10 is a detailed side view of another embodiment of the redirecting assembly shown in FIG. 9.

FIG. 9 is a detailed size view of another embodiment of a redirecting assembly 348 for use with the round baler 200. The redirecting assembly 348 illustrated in FIGS. 9 and 10 is similar to the redirecting assembly 248 (shown in FIGS. 5-8), with the differences noted below, and as such, the same reference numbers for the same components are used in FIGS. 9 and 10 as were used in FIGS. 5-8. The redirecting assembly 348 is located in a fixed position proximate the bale formation chamber 205 throughout operation of the round baler 200. That is, the position of the redirecting assembly 348 is fixed throughout all phases of bale formation within the round baler 200, including, but not limited to, an empty bale formation chamber 205, any size of bale within the bale formation chamber 205, wrapping the bale within the bale formation chamber 205, and/or dumping the formed bale from the round baler 200.

As illustrated in FIG. 9, the redirecting assembly 348 includes the second upper throat roller 242, with the one or more redirecting belts 282 being routed around the upper redirecting roller 280, the upper throat roller 240, and the second upper throat roller 242. As illustrated in FIG. 9, the redirecting assembly 348 may be positioned such that there is significant contact between the one or more redirecting belts 282 and the one or more bale forming belts 220.

FIG. 10 is a detailed side view of another embodiment of the redirecting assembly 348. As illustrated in FIG. 10, the redirecting assembly 348 may be positioned such that there is minimal, or no, contact between the one or more redirecting belts 282 and the one or more bale forming belts 220.

Figure 11:
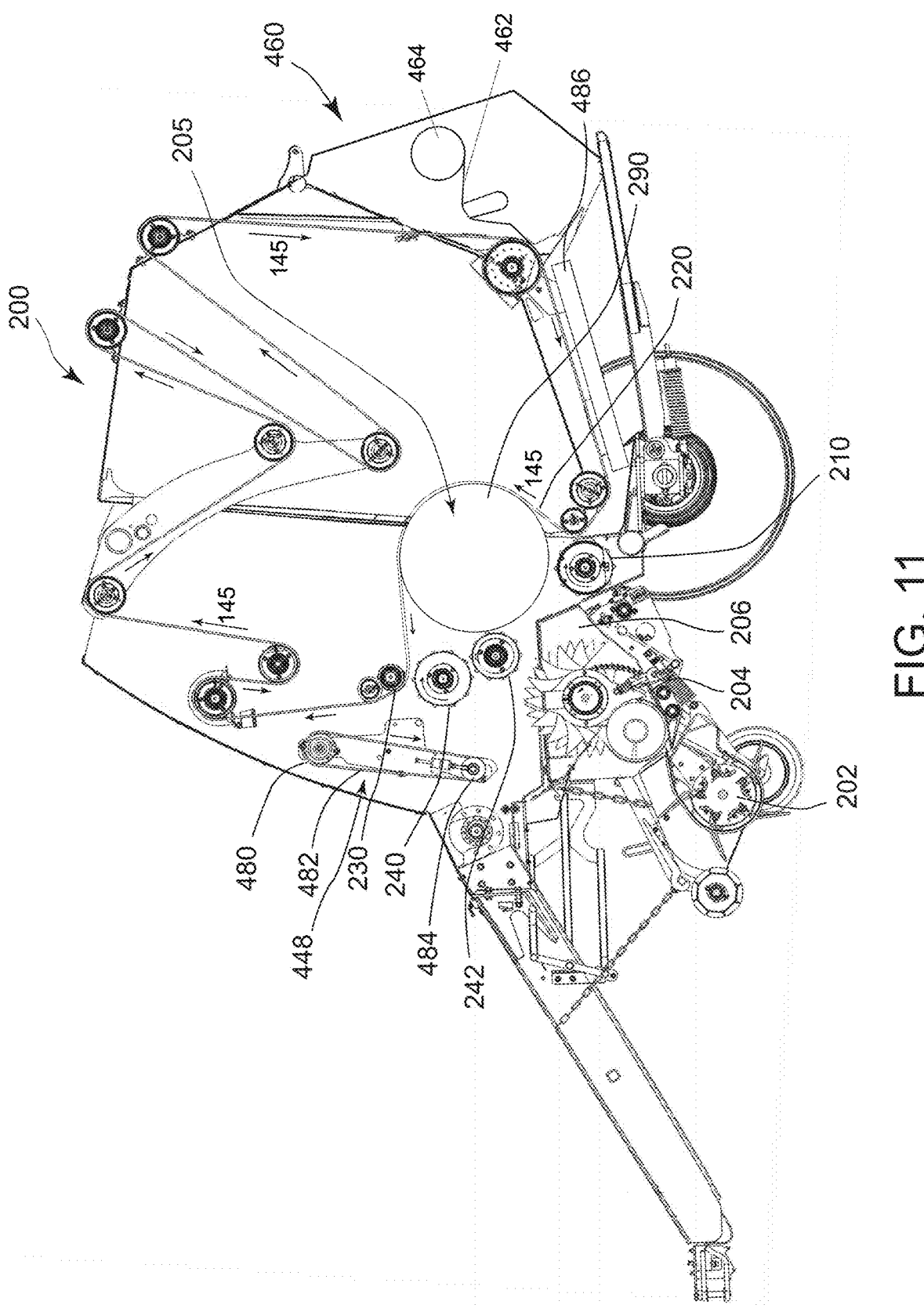
FIG. 11 is a side view of yet another embodiment of a redirecting assembly for use with a round baler.
Figure 12:
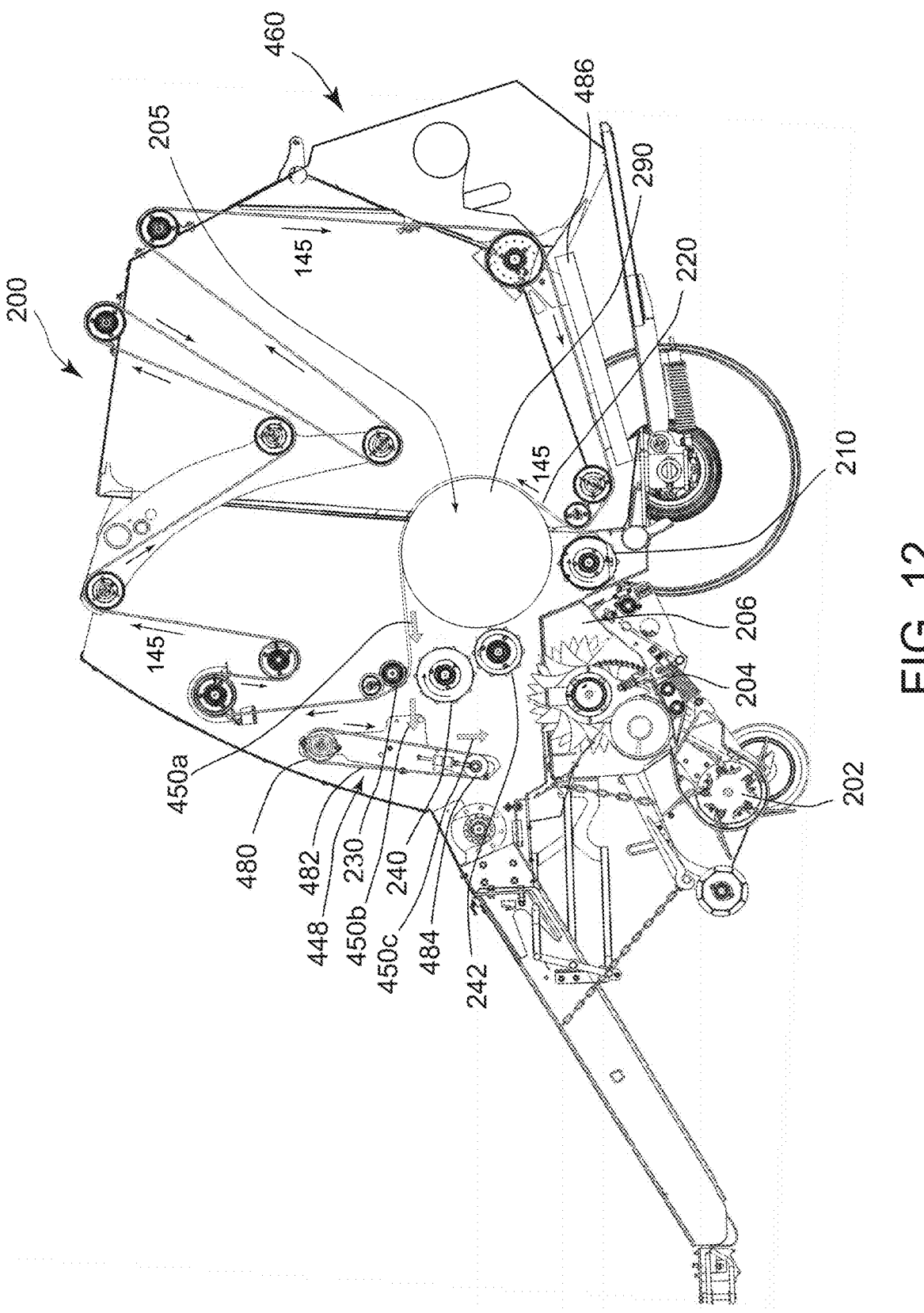
FIG. 12 is a side view of the redirecting assembly shown in FIG. 11, including a bale growing in size and accompanying crop trajectories as the bale is formed.

FIGS. 11 and 12 are side views of the round baler 200 including another embodiment of a redirecting assembly 448. The redirecting assembly 448 illustrated in FIGS. 11 and 12 is similar to the redirecting assembly 248 (shown in FIGS. 5-8) and the redirecting assembly 348 (shown in FIGS. 9 and 10), with the differences noted below, and as such, the same reference numbers for the same components are used in FIGS. 11 and 12 as were used in FIGS. 5-10. The redirecting assembly 448 is located in a fixed position proximate the bale formation chamber 205 throughout operation of the round baler 200. That is, the position of the redirecting assembly 448 is fixed throughout all phases of bale formation within the round baler 200, including, but not limited to, an empty bale formation chamber 205, any size of bale within the bale formation chamber 205, wrapping the bale within the bale formation chamber 205, and/or dumping the formed bale from the round baler 200. The round baler 200 may also include a wrapping device 460 and a crop material conveyor 486.

In the example embodiment, the redirecting assembly 448 facilitates redirecting stray crop material that may undesirably exit the bale formation chamber 205 towards the crop feeding device 204, to then be moved by the crop feeding device 204 back towards the bale formation chamber 205. As illustrated in FIG. 11, the redirecting assembly 448 includes an upper redirecting roller 480, one or more redirecting belts 482, and a lower redirecting roller 484, with the one or more redirecting belts 482 being routed in a clockwise direction around the upper redirecting roller 480 and the lower redirecting roller 484. The redirecting assembly 448 is positioned proximate the gap that may be present between the front belt roller 230 and the upper throat roller 240.

The wrapping device 460 may feed wrap material into the bale formation chamber 205 to be used for wrapping a formed bale of cropped material. For example, the wrapping device 460 may feed wrap material into the bale formation chamber 205 at a location around the bale formation chamber 205 that is distinct from the gap between the front belt roller 230 and the upper throat roller 240. The wrapping device 460 may dispense a wrap material 462 from a wrap material roll 464 and guide the wrap material 462 into contact with an exterior of the bale 290.

For example, as illustrated in FIG. 12, crop material may contact the one or more bale forming belts 220 to be moved towards the front belt roller 230 along a first trajectory 450$a$. When crop material moving along the first trajectory 450$a$ reaches the front belt roller 230, some stray crop material may exit the bale formation chamber 205 along a second trajectory 450$b$ through the gap between the front belt roller 230 and the upper throat roller 240. As such, the second trajectory 450$b$ represents an undesirable crop material trajectory as the one or more bale forming belts 220 separate from the surface of the bale of crop material to pass around the front belt roller 230.

Additionally, when stray crop material moving along the second trajectory 450$b$ contacts the redirecting assembly 448, the direction of rotation of the one or more redirecting belts 482 may move the stray crop material along a third trajectory 450$c$ towards the crop pickup device 202 and the crop feeding device 204. In some embodiments, the redirecting assembly 448 may be powered by a drive system independent of the drive system of the round baler 200. For example, the redirecting assembly 448 may be powered by a motor, such as, but not limited to, a hydraulic motor or an electric motor, or by a mechanical drive including a belt drive or a chain drive.

Figure 13:
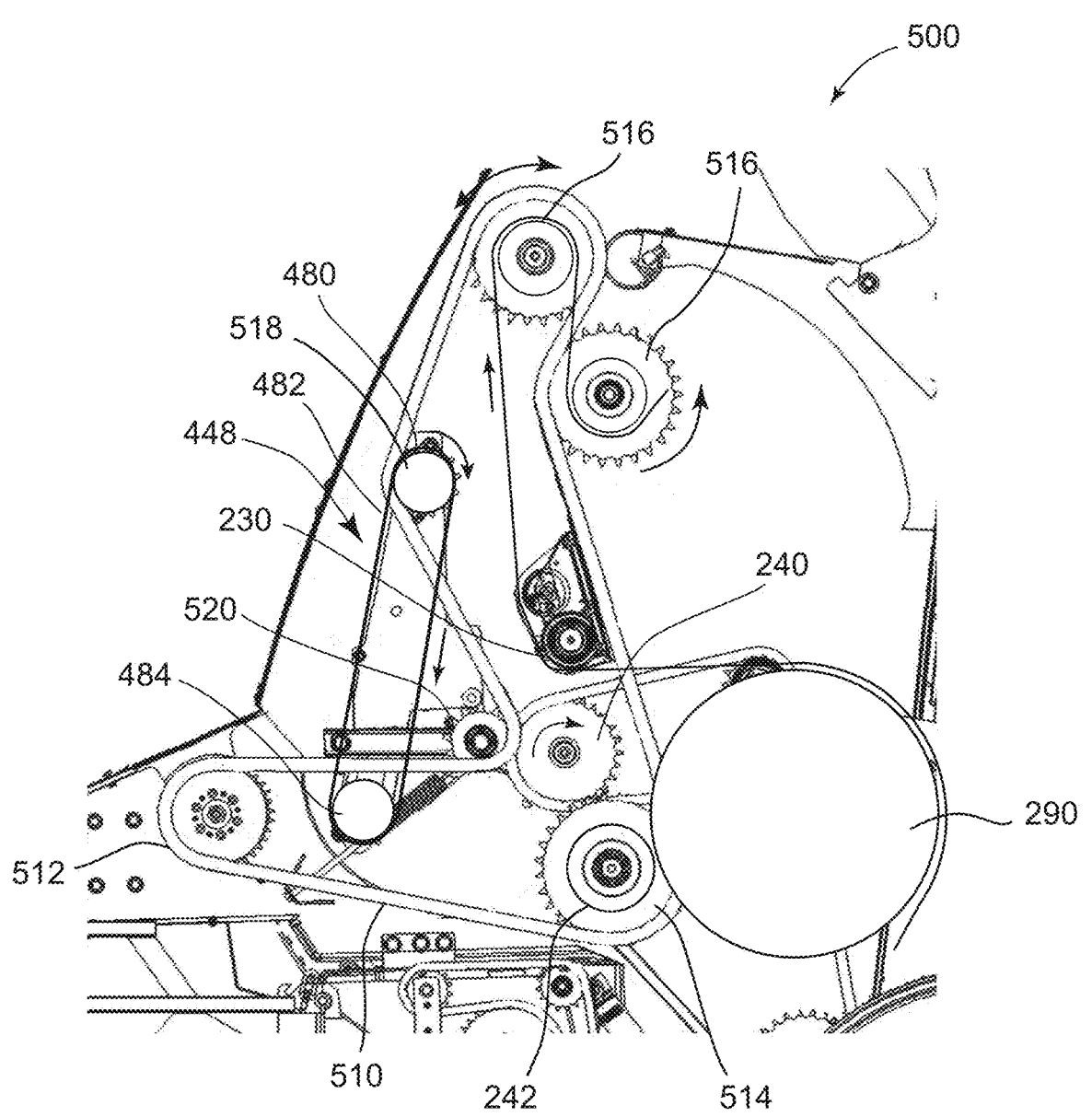
FIG. 13 is a detailed side view of a drive arrangement for use with the redirecting assembly shown in FIG. 11.

FIG. 13 is a side view of one embodiment of a drive arrangement 500 to be used with the redirecting assembly 448. In the example embodiment, the drive arrangement 500 includes a chain 510 routed around a series of sprockets, including a drive sprocket 512, an upper throat drive sprocket 514, one or more belt roller drive sprockets 516, a roller sprocket 518, and a tightener sprocket 520. In some embodiments, the drive sprocket 512 may be driven by a mechanical connection to the power source of the round baler 200, such as a tractor driveline. The roller sprocket 518 is mounted to the upper redirecting roller 480.

In the example embodiment, the chain 510 travels in a clockwise direction by the series of sprockets. The size of some or all of the series of sprockets, including the drive sprocket 512, the upper throat drive sprocket 514, the one or more belt roller drive sprockets 516, the roller sprocket 518, and/or the tightener sprocket 520, may vary to rotate the driven rollers, and thus move the chain 510, at a specific speed to facilitate improving the operation efficiency of the round baler.

In the example embodiment, the upper redirecting roller 480 is positioned such that the one or more redirecting belts 482 intercept stray crop material undesirably exiting the bale formation chamber (as shown in FIG. 12). Additionally, the upper redirecting roller 480 may be positioned such that the chain 510 engages the roller sprocket 518 mounted to the upper redirecting roller 480. In some embodiments, a diameter of the upper redirecting roller 480 may be selected, in conjunction with the size of the roller sprocket 518, for the speed of the one or more redirecting belts 482 and the speed of the one or more bale forming belts 220 to be a specific ratio. For example, the speed of the one or more redirecting belts 482 may be greater than the speed of the one or more bale forming belts 220, such as 1.25 to 1.5 times the speed of the one or more bale forming belts 220.

Figure 14:
FIGS. 14-16 are side views of still other embodiments of a redirecting assembly for use with a round baler.

FIG. 14 is a side view of the round baler 200 including yet another embodiment of a redirecting assembly 648, including a plate 602 to redirect stray crop material that may undesirably exit the bale formation chamber 105. The redirecting assembly 648 is located in a fixed position proximate the bale formation chamber 205 throughout operation of the round baler 200. That is, the position of the redirecting assembly 648 is fixed throughout all phases of bale formation within the round baler 200, including, but not limited to, an empty bale formation chamber 205, any size of bale within the bale formation chamber 205, wrapping the bale within the bale formation chamber 205, and/or dumping the formed bale from the round baler 200.

As shown in FIG. 14, stray crop material may move along a first trajectory 650a, through the gap between the front belt roller 230 and the upper throat roller 240, and then along a second trajectory 650b towards the plate 602. When stray crop material moving along the second trajectory 650b contacts the redirecting assembly 648, the stray crop material may be redirected by the plate 602 along a third trajectory 650c towards the crop pickup device 202 and the crop feeding device 204.

Figure 15:
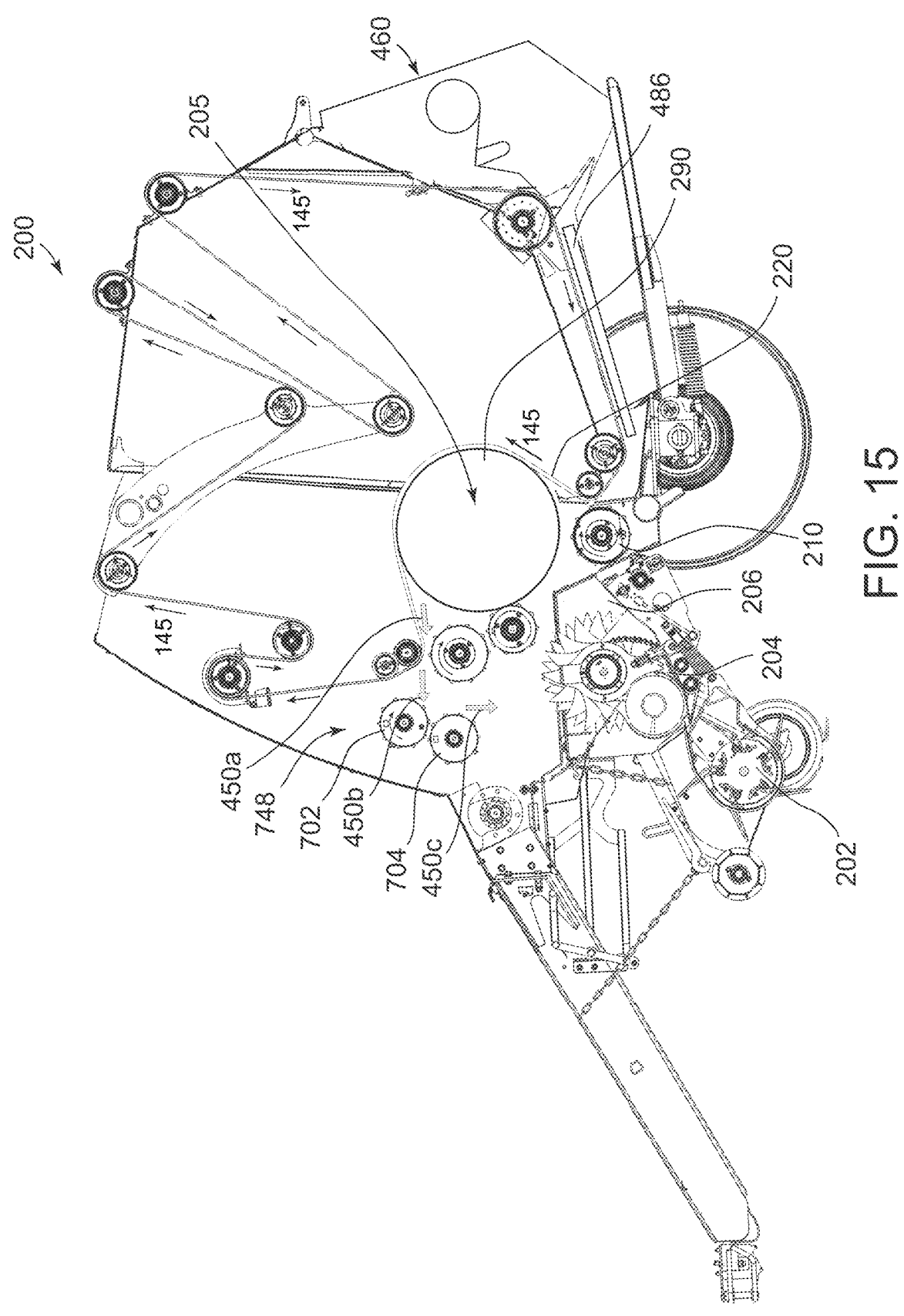
Figure 16:
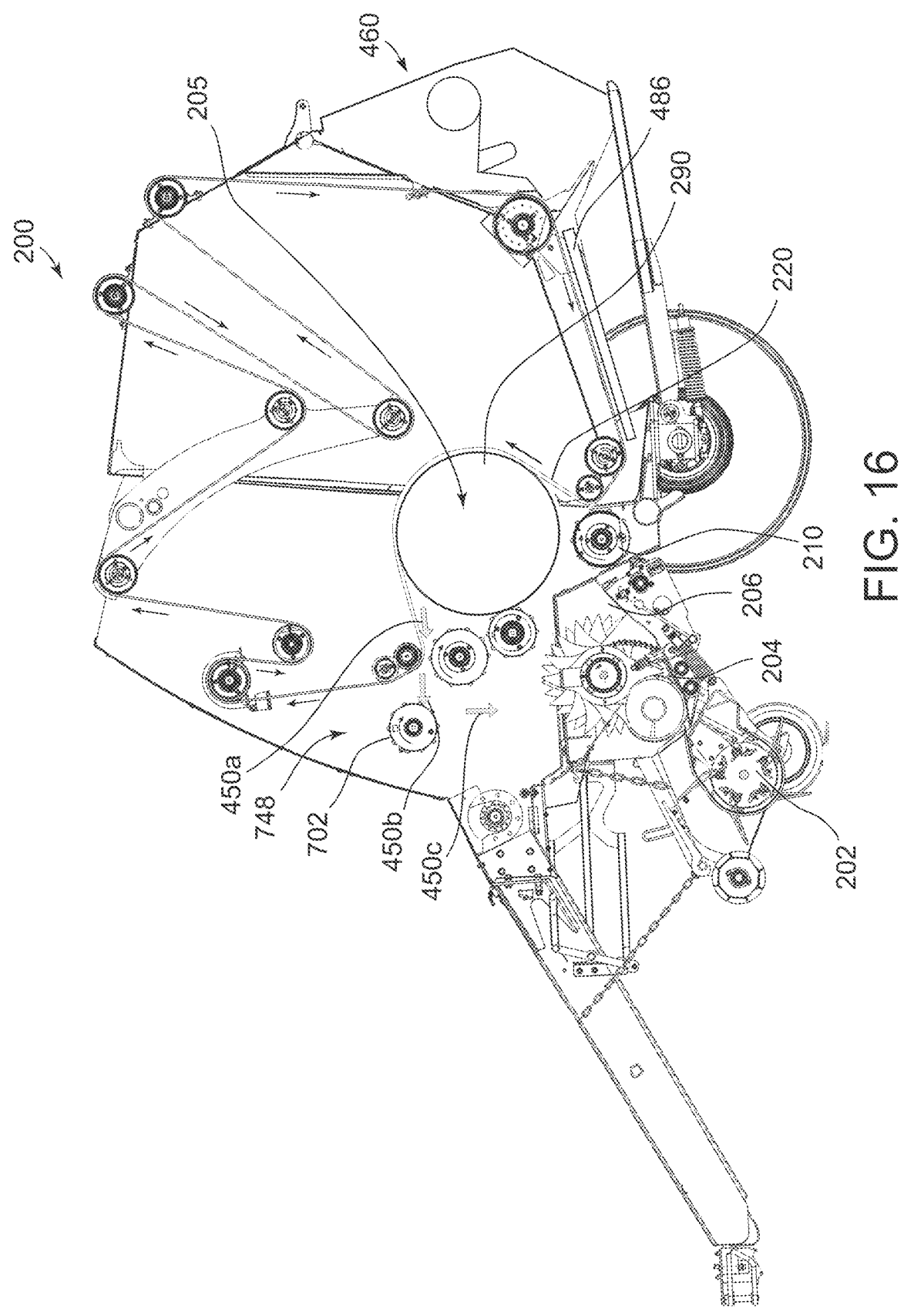

FIG. 15 is a side view of the round baler 200 including still another embodiment of a redirecting assembly 748, including a first redirecting roller 702 and a second redirecting roller 704. FIG. 16 is a side view of the round baler 200 including the redirecting assembly 748, including only the first redirecting roller 702. The redirecting assembly 748 is located in a fixed position proximate the bale formation chamber 205 throughout operation of the round baler 200. That is, the position of the redirecting assembly 748 is fixed throughout all phases of bale formation within the round baler 200, including, but not limited to, an empty bale formation chamber 205, any size of bale within the bale formation chamber 205, wrapping the bale within the bale formation chamber 205, and/or dumping the formed bale from the round baler 200.

As shown in FIGS. 15 and 16, stray crop material may move along a first trajectory 750a, through the gap between the front belt roller 230 and the upper throat roller 240, and then along a second trajectory 750b towards the first redirecting roller 702 and/or the second redirecting roller 704. When stray crop material moving along the second trajectory 750b contacts the redirecting assembly 748, the stray crop material may be redirected by the first redirecting roller 702 and/or the second redirecting roller 704 along a third trajectory 750c towards the crop pickup device 202 and the crop feeding device 204.

When introducing elements of various embodiments disclosed herein, the articles "a", "an", "the", and "said" are intended to mean that there are one or more of the elements. The terms "comprising", "including", and "having" are intended to be inclusive and mean that there may be additional elements other than the listed elements.

Unless otherwise indicated, approximating language, such as "generally", "substantially", and "about", as used herein indicates that the term so modified may apply to only an approximate degree, as would be recognized by one of ordinary skill in the art, rather than to an absolute or perfect degree. Accordingly, a value modified by a term or terms such as "about", "approximately", and "substantially" is not to be limited to the precise value specified. In at least some instances, the approximating language may correspond to the precision of an instrument for measuring the value. Additionally, unless otherwise indicated, the terms "first", "second", etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

This written description uses examples to disclose the invention, including the best mode and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A baling system for baling crop material, the baling system comprising:
   one or more bale-forming belts;
   one or more rollers;
   a bale formation chamber being defined in part by the one or more bale-forming belts and the one or more rollers;
   a crop feeding device operable to convey crop material towards the bale formation chamber; and
   a redirecting assembly in a fixed position spaced from the bale formation chamber to redirect stray crop material exiting the bale formation chamber towards the crop feeding device.

2. The baling system of claim 1, wherein the redirecting assembly comprises a belt.

3. The baling system of claim 1, wherein the redirecting assembly further comprises at least one roller that rotates about an axis in a fixed position relative to the bale formation chamber.

4. The baling system of claim 1, wherein the redirecting assembly comprises a plate.

5. The baling system of claim 1, wherein the bale formation chamber comprises a gap, the gap creating a stray crop material exit location as crop material is rotated in the bale formation chamber.

6. The baling system of claim 5, wherein the redirecting assembly includes a belt including a length that is longer than the gap of the bale formation chamber, and wherein the redirecting assembly is orientated such that the belt spans across the gap.

7. The baling system of claim 5, wherein the gap is formed where crop material rotating in the bale formation chamber transitions from a belt surface of the one or more bale-forming belts to a roller surface of the one or more rollers.

8. The baling system of claim 5, further comprising a wrapping device, wherein wrap material fed by the wrapping device enters the bale formation chamber at a location distinct from the gap.

9. The baling system of claim 1, wherein the one or more rollers defining the bale formation chamber comprise a lower inlet roller and one or more upper inlet rollers, the lower inlet roller and the one or more upper inlet rollers defining a crop inlet through which crop material is conveyed from the crop feeding device towards the bale formation chamber.

10. The baling system of claim 9, wherein the redirecting assembly is positioned to redirect stray crop material towards the crop feeding device for passage through the crop inlet towards the bale formation chamber.

11. The baling system of claim 9, wherein the one or more bale-forming belts travel in a first direction, and wherein the lower inlet roller rotates in the first direction to propel crop material into contact with the one or more bale-forming belts.

12. The baling system of claim 1, the redirecting assembly and the bale formation chamber are positioned on opposing sides of the one or more rollers.

13. The baling system of claim 1, wherein at least a portion of the redirecting assembly is positioned vertically above the bale formation chamber at some time during bale formation.

14. A round baler comprising:
a crop pickup device;
one or more bale-forming belts;
one or more rollers;
a bale formation chamber being defined in part by the one or more bale-forming belts and the one or more rollers;
a crop feeding device operable to convey crop material from the crop pickup device towards the bale formation chamber; and
a redirecting assembly in a fixed position spaced a distance from the bale formation chamber to redirect stray crop material exiting the bale formation chamber towards the crop feeding device.

15. The round baler of claim 14, wherein the redirecting assembly comprises a belt.

16. The round baler of claim 14, wherein the redirecting assembly further comprises at least one roller that rotates about an axis in a fixed position relative to the bale formation chamber.

17. The round baler of claim 14, wherein the redirecting assembly comprises a plate.

18. The round baler of claim 14, wherein the bale formation chamber comprises a gap, the gap creating a stray crop material exit location as the crop material is rotated in the bale formation chamber.

19. The round baler of claim 18, wherein the redirecting assembly includes a belt including a length that is longer than the gap of the bale formation chamber, and wherein the redirecting assembly is orientated such that the belt spans across the gap.

20. The round baler of claim 14, wherein the one or more rollers defining the bale formation chamber comprise a lower inlet roller and one or more upper inlet rollers, the lower inlet roller and the one or more upper inlet rollers defining a crop inlet through which crop material is conveyed from the crop feeding device, and wherein the redirecting assembly is positioned to redirect stray crop material towards the crop feeding device for passage through the crop inlet towards the bale formation chamber.

* * * * *